(12) United States Patent
Shenhar

(10) Patent No.: US 8,814,084 B2
(45) Date of Patent: Aug. 26, 2014

(54) CONTROLLABLE BUOYANT SYSTEM AND METHOD

(75) Inventor: Oz Shenhar, Ra'anana (IL)

(73) Assignee: New Create Ltd., Tel Aviv (IL)

( * ) Notice: Subject to any disclaimer, the term of this patent is extended or adjusted under 35 U.S.C. 154(b) by 0 days.

(21) Appl. No.: 13/699,095

(22) PCT Filed: May 24, 2011

(86) PCT No.: PCT/IL2011/000403
§ 371 (c)(1),
(2), (4) Date: Nov. 20, 2012

(87) PCT Pub. No.: WO2011/148373
PCT Pub. Date: Dec. 1, 2011

(65) Prior Publication Data
US 2013/0062458 A1    Mar. 14, 2013

(30) Foreign Application Priority Data

May 25, 2010 (GB) .................................. 1008695.7

(51) Int. Cl.
| | |
|---|---|
| *B64B 1/44* | (2006.01) |
| *B64B 1/58* | (2006.01) |
| *B64B 1/62* | (2006.01) |
| *B64B 1/64* | (2006.01) |
| *A63H 27/10* | (2006.01) |
| *F21V 3/02* | (2006.01) |

(52) U.S. Cl.
CPC ................ *A63H 27/10* (2013.01); *F21V 3/026* (2013.01); *B64B 1/62* (2013.01); *A63H 2027/1066* (2013.01); *B64B 1/44* (2013.01)
USPC .................. 244/97; 244/98; 244/128; 244/31

(58) Field of Classification Search
CPC .............. B64B 1/70; B64B 1/62; B64B 1/60; B64B 1/58; B64B 1/44; B64B 1/40; B64B 1/00
USPC ................. 244/98, 97, 96, 128, 33, 31, 24, 5; 441/29, 28, 21; 40/214, 212
See application file for complete search history.

(56) References Cited

U.S. PATENT DOCUMENTS 2,492,800 A * 12/1949 Isom ................................ 244/97
2,524,567 A * 10/1950 Isom ................................ 244/97
(Continued)

FOREIGN PATENT DOCUMENTS

| FR | 2372075 | 6/1978 |
| SU | 828582 A1 | 3/2014 |

(Continued)

OTHER PUBLICATIONS

"NOAA Smart Balloon", NOAA Air Resources Laboratory Field Research Division. Available since Jan. 25, 2010, as accessed through the Internet Archive at https://web.archive.org/web/20100125112036/http://www.noaa.inel.gov/capabilities/smartballoon/smartballoon.htm.*

(Continued)

*Primary Examiner* — Tien Dinh
*Assistant Examiner* — Richard R Green
(74) *Attorney, Agent, or Firm* — Dinsmore & Shohl LLP

(57) ABSTRACT

A controllable buoyant system (10) includes a support structure having a sealed hollow enclosure (12) containing a first gas and surrounded by a second gas, either the first gas or the second gas being lighter than ambient air. The hollow enclosure is pre-filled with the first gas via a one-way valve that prevents the first gas escaping and an altitude sensor (14) generates an altitude signal indicative of a height of the support structure. A height transducer (17, 21, 61, 66, 67, 68) coupled to the hollow enclosure is responsive to the altitude signal for varying the buoyancy of the support structure. A controller (15) is coupled to the altitude sensor and to the height transducer and is responsive to the altitude signal and to at least one reference altitude signal for automatically controlling the height transducer in order to maintain the support structure buoyant at the preset altitude.

26 Claims, 9 Drawing Sheets

(56) References Cited

U.S. PATENT DOCUMENTS

| | | | |
|---|---|---|---|
| 3,839,631 | A | 10/1974 | Goddard |
| 3,957,228 | A | 5/1976 | Kennedy, Jr. |
| 5,645,248 | A * | 7/1997 | Campbell ............... 244/96 |
| 5,782,668 | A | 7/1998 | Chabert |
| 6,600,899 | B1 | 7/2003 | Radomsky et al. |
| 6,685,136 | B2 * | 2/2004 | Yajima et al. ............ 244/31 |
| 7,341,224 | B1 | 3/2008 | Osann, Jr. |
| 2006/0065777 | A1 | 3/2006 | Walden et al. |
| 2008/0135678 | A1 | 6/2008 | Heaven |
| 2008/0265086 | A1 | 10/2008 | Lee |
| 2008/0299990 | A1 | 12/2008 | Knoblach et al. |
| 2009/0189015 | A1 * | 7/2009 | Alavi ..................... 244/97 |
| 2010/0152933 | A1 * | 6/2010 | Smoot et al. ............ 701/16 |

FOREIGN PATENT DOCUMENTS

| | | |
|---|---|---|
| WO | 95/04407 | 2/1995 |
| WO | 2007/036930 A2 | 4/2007 |
| WO | 2008/051638 A2 | 5/2008 |

OTHER PUBLICATIONS

International Search Report dated Jul. 10, 2011 pertaining to PCT/IL2011/000403.
International Preliminary Report on Patentability dated Sep. 18, 2012 pertaining to PCT/IL2011/000403.

* cited by examiner

CONTROLLABLE BUOYANT SYSTEM AND METHOD

FIELD OF THE INVENTION

This invention relates to a controllable buoyant system for anchoring objects in space without requiring an anchoring point connected to ground.

BACKGROUND OF THE INVENTION

WO 07/036930 in the name of the present applicant describes an object adapted to float in air when filled with a gas having lower specific gravity than air, the object including a hollow enclosure having an inlet coupled to a pressure adjustment means for regulating pressure of gas within the enclosure so as to ensure that a buoyancy force alone of the enclosure counteracts a weight of the object. A number of general approaches for regulating gas pressure within the enclosure are suggested. Thus, in accordance with one approach the enclosure is part of a buoyant platform, which supports an object in space and it is suggested to couple a gas connector to an inlet of the enclosure via an adjustable pressure valve, whereby gas may be fed at a controlled pressure to the buoyant platform. By such means the buoyancy of the platform may be adjusted so as to exactly counteract the combined weight of the buoyant platform and the attached object, thereby allowing the buoyancy of the platform to be adjusted when different objects are attached.

The adjustable pressure valve may be set using trial and error so that the gas pressure is exactly correct to achieve buoyancy for an object anchored to the support structure or integral therewith. Alternatively, the user may be informed of a suitable gas pressure to supply to the buoyant support structure, based on the buoyant gas being used, expected ambient conditions, and the mass of the object to be supported.

It is also suggested to adjust gas pressure using a flexible diaphragm within the hollow support structure and to adjust the effective gas volume within the hollow support structure by displacement of the flexible diaphragm.

While such approaches work when conditions are clearly defined and not subject to constant fluctuation, they are not suited for maintaining a constant height when ambient conditions vary. Particularly, the devices described in WO 07/036930 are apt to wander unless tethered, owing to air currents for example. Moreover, the need to calibrate the pressure valve according to different ambient conditions and objects may not be convenient or may not be possible with sufficient accuracy. It is suggested to provide a remote controlled propeller so as to allow controlled movement in space of the supported object.

U.S. Pat. No. 7,341,224 discloses a miniature robot surveillance balloon system having an electronic processor subsystem that controls vertical movement. Buoyancy may be controlled using a gas cylinder carried by the balloon assembly and containing a gas that is lighter than air, such as helium. In another embodiment, the balloon is pre-inflated so as to obviate the need to attach a gas cylinder to the balloon assembly. In such case, the only way that the effective buoyancy of the balloon may be increased is to jettison ballast. And regardless of whether or not an external gas cylinder is provided, the only way that the effective buoyancy of the balloon may be decreased is to release gas from the balloon. Such an approach is acceptable where the principal requirement is to raise the surveillance system to a predetermined height and then bring it back to earth. However, it is not acceptable where servo-assisted altitude regulation is required because once the helium is released in order to reduce buoyancy there is no way that the buoyancy can be subsequently raised since the quantity of helium cannot be increased. This is an inherent problem with using the helium to regulate the buoyancy as distinct from merely providing the buoyancy. Furthermore, the need to carry a gas cylinder is not practical for portable devices where the mass of the gas cylinder may well exceed that of the rest of the system.

US 2006/0065777 discloses a density control buoyancy system having a processor controlling valves, an inlet valve allowing air into a compartment to compress lifting gas and an outlet valve for releasing air from the compartment to decompress the lifting gas. An airship shown in FIG. 3A has a rigid outer hull containing lifting gas and which contains an inner flexible compartment that contains air that may be regulated to control buoyancy. A controller controls the functions and operations of the inlet valve and/or pump and the outlet valve and/or pump for regulating air flow.

The controller allows equilibrium to be maintained once the airship has reached a required height under manual control of a pilot, but it is not capable of automatically raising the airship accurately to a required height. Moreover, the principle of operation is based on density control, whereby differential pressure between a lifting gas (helium) inside the hull and air inside the flexible compartment is used to regulate air flow into or out of the flexible compartment in order to maintain equilibrium. It is clear that while such an approach may be feasible for an airship where differential pressure over an extended height range may be measurable, it is not feasible for use at limited height ranges where pressure gradients are negligible. To put this in perspective, pressure at sea level is 101,325 Pa, and at 5 meters is 101,253 Pa. At a height of 1 km, it is 87,836 Pa and at a height of 10 km it is 24,283 Pa. Thus, while pressure gradient between sea level and 1 km is significant, the pressure difference over a height difference of 5 m is a mere 72 Pa, which is probably too low to serve as a practical error signal for a servo control system. Certainly, the difference in atmospheric pressure at 3 m (101,282 Pa) and 3.5 m (101,274 Pa) is a mere 8 Pa and it is clear that this cannot serve as a practical feedback signal. Likewise, once the airship has reached a target altitude, to maintain it at this altitude to within a resolution of ±1 m based on differential pressure feedback is inconceivable. It will equally be appreciated that other ambient conditions such as temperature that might be used directly or indirectly to provide a servo error signal at exalted altitudes are not suitable at low absolute or differential altitudes.

Furthermore, controlling height based on pressure variations allows height to be maintained relative to sea level, but it does not accommodate variations is terrain. This is not a problem for an airship which climbs to a sufficiently high altitude to be well clear of tall buildings and mountains. But it is not suitable for accurate height control relative to ground.

It is thus clear that US 2006/0065777 is not amenable to lifting an object to a set height in a confined space such as a room or to maintain the object at the set height to within an accuracy of less than 1 meter.

US 2008/0265086 discloses a lift gas ballast system for a tethered aerostat used in an airship has lift gas ballast tank that is disposed on the ground, and connected to tethered aerostat through the double slip ring and the hollow feed tube.

US 2008/0135678 discloses an airship for transporting passengers and cargo, having a controller which regulates flow of first gas into and out of a compartment to actively control the ascent and descent of airship.

U.S. Pat. No. 5,782,668 discloses a balloon for advertising having an internal light connected to a fixed power supply and which is disconnected if the balloon deflates or its surface deforms.

U.S. Pat. No. 3,839,631 discloses an automatically equilibrating inflated suspended object that is lighter than the surrounding medium. Equilibrium is automatically achieved by means of a flexible tether extending from a fixed elevated point to the object. Vertical movement of the object varies the portion of the weight of the tether supported by the object until the object supported weight of the tether equals the lift.

FR 2 372 075 discloses a helium filled distress balloon whose altitude is stabilized using air, and which is fitted with a transmitter.

SUMMARY OF THE INVENTION

It is an object of the present invention to provide a buoyant support structure having a controller for controlling the height of the support structure that does not require an anchoring point connected to ground or calibration for each object attached thereto and that provides better control than the approaches proposed in WO 07/036930.

In accordance with a first aspect of the invention there is provided a controllable buoyant system comprising:

a support structure having a sealed hollow enclosure for containing a first gas and being surrounded by a second gas such that either the first gas or the second gas is lighter than ambient air, said hollow enclosure being pre-filled with said first gas via a one-way valve that prevents the first gas from escaping from the hollow enclosure, an altitude sensor for generating an altitude signal indicative of a height of the support structure, a height transducer coupled to the support structure and responsive to the altitude signal for varying buoyancy of the support structure, and a controller coupled to the altitude sensor and to the height transducer and being responsive to said altitude signal and to at least one reference altitude signal for automatically controlling the height transducer in order to maintain the support structure buoyant at the preset altitude.

In one embodiment, the hollow enclosure is elastic and is disposed within an outer enclosure containing a sufficient volume of helium to provide the required buoyancy and air is pumped into the hollow inner enclosure and serves as a ballast weight. A controlled height is thus achieved by adding to or releasing air from the inner enclosure.

In some embodiments, a change in volume of the inner chamber is achieved mechanically.

In some embodiments, a controlled change in density of the first gas in the hollow chamber serves to adjust the buoyancy of the support structure.

In some embodiments, an object may be attached to the support structure and the height transducer controlled in order to maintain buoyancy of the support structure at a predetermined altitude, which may be selected via a suitable selector so that the buoyant platform together with the attached object reaches an equilibrium position where a buoyancy force of the platform counteracts a combined weight of the platform and attached object.

In such embodiments, the object may be integral with the buoyant platform and may be a self-powered electrical device operating on a battery or solar energy. The object may be separate from the support structure or integral therewith.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
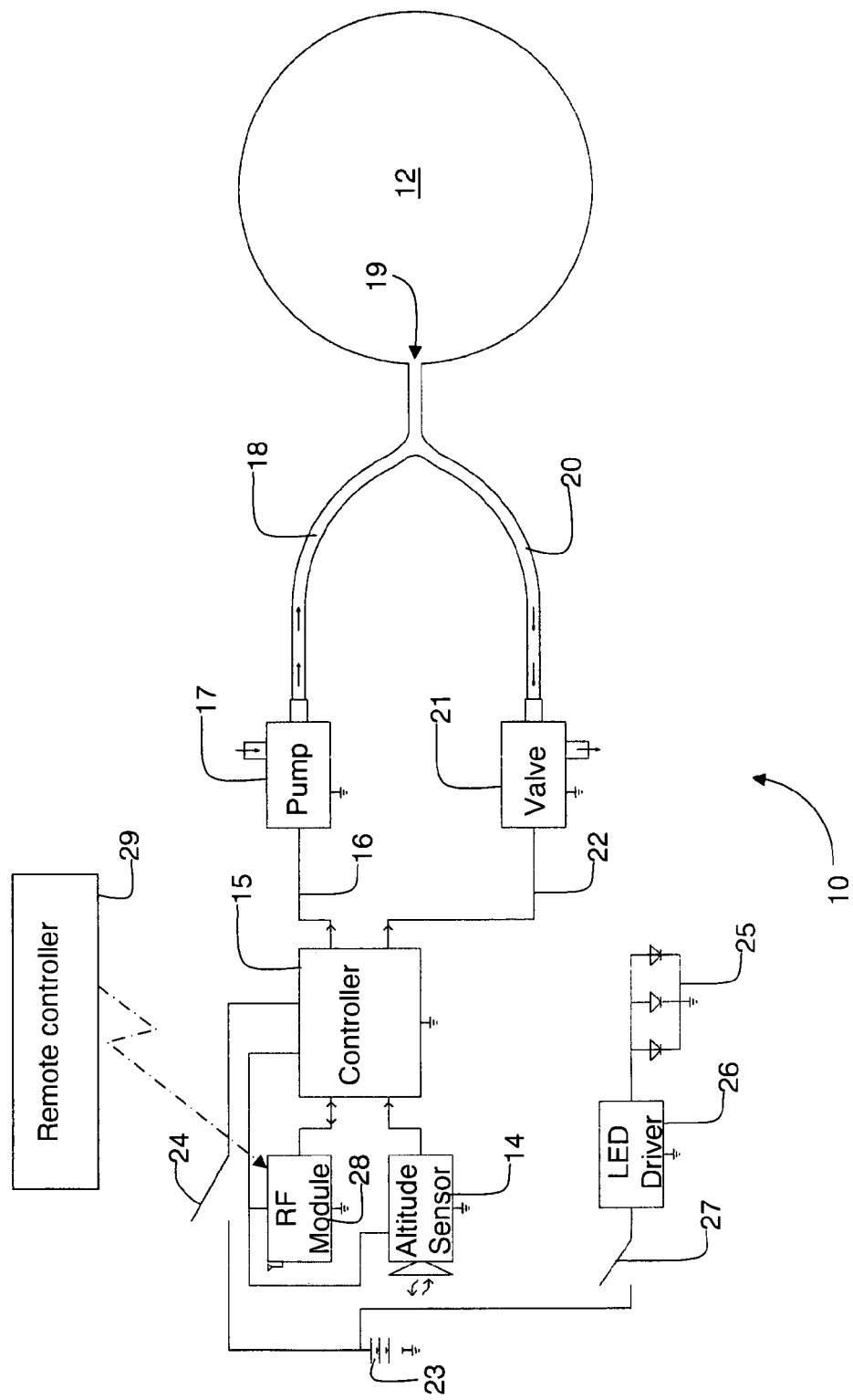
FIG. 1 shows schematically the basic principle of a control system for regulating height of a free-standing object in space according to an embodiment of the invention.

In the following description, features that appear in more than one drawing will be identified by identical reference numerals.

Figure 2A:
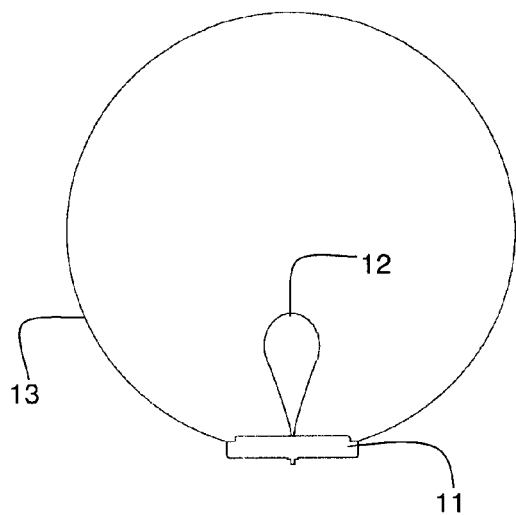
FIGS. 2a and 2b show schematically a support structure having a height transducer in accordance with an embodiment of the invention.
Figure 2B:
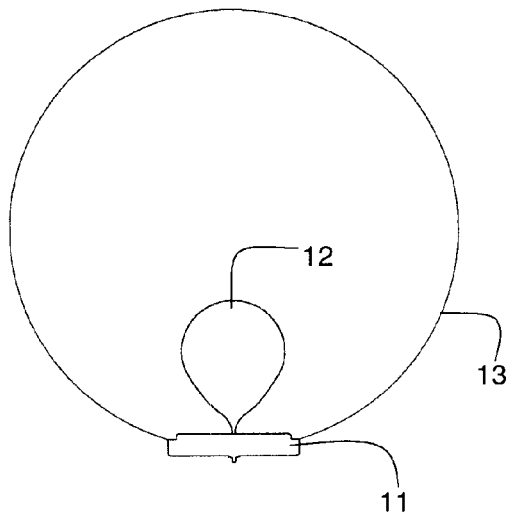

FIG. 1 shows functionally a control system 10 according to a first embodiment for regulating the height in space of a support structure 11 shown schematically in FIGS. 2a and 2b. The support structure 11 includes a flexible balloon 12 (constituting a hollow enclosure) that is sealingly supported inside an outer enclosure 13 (shown in FIGS. 2a and 2b). The balloon 12 contains an adjustable volume of a first gas that is surrounded by a different second gas in the outer enclosure. Typically the first gas in the balloon 12 is air and the second gas in the outer enclosure 13 is helium. An altitude sensor 14 is mounted in association with the support structure 11 for generating an altitude signal that is a function of an altitude of the support structure, and a controller 15 is coupled to the altitude sensor 14 and is responsive to the altitude signal for automatically adjusting the volume and hence mass of air in the flexible balloon 12 so as to maintain the support structure buoyant at a predetermined altitude.

It is to be understood within the context of the invention and the appended claims that the term "support structure" embraces a platform that is integral with an object to be lifted as well as a platform that includes the inner and outer enclosures as well as the controller but allows attachment to the platform of an external object. In the latter case, the controller must be capable of external calibration by the user to compensate for differences in weight of the attached objects. When the object and the support structure are integral, the controller may be factory-set according to the known combined weight.

The support structure can include hovering three dimensional toys and gadgets for children, interior design products, casings or displays for luxury consumer goods or for collectors' items or art pieces. Products for the advertising industry, such as billboards, flags, screens and the like, as well as emergency signaling products for rescue can likewise be supported using the principles of the invention. The invention may also find application for supporting products such as cameras for surveillance and security, especially in very large spaces or in areas where access is limited and there is no infrastructure. Yet another application of the invention is for outside support of objects such as camping and emergency lighting or other temporary outdoor deployment, for instance for construction or maintenance work (e.g. car breakdown repair in a non-lit area).

Height adjustment may be achieved according to a number of different physical approaches, of which only a representative approach is shown in FIG. 1 where the outer enclosure 13 is rigid and of sufficient volume so that when filled with helium there is sufficient buoyancy to support the support structure 11 including any object supported thereby in free space. As will now be explained use of a flexible inner balloon is only one possibility, since a flexible outer balloon may also be employed. In all cases, the net buoyancy of the support structure is adjusted by a height transducer based on any one of several physical properties, as a function of height. In order to achieve equilibrium where the support structure 11 hovers in air at a nominally fixed height, air is pumped into the balloon 12, so that as more air is pumped it expands as shown in FIG. 2b, until the additional weight of the air supersedes the buoyancy of the helium thus causing the support structure 11 to fall. When the support structure 11 falls below a predetermined level as detected by the altitude sensor 14, a valve in the air supply to the balloon 12 is opened so as to release air, thereby reducing the weight of the air until the buoyancy of the helium supersedes the weight of the air when the valve is closed. The support structure 11 now rises and the cycle of opening and closing the valve is continuously repeated.

Having described the basic principle of operation of the control system 10, the embodiment shown in FIG. 1 will now be described more fully. The controller 15 has a first output which is electrically coupled via a first wire 16 to a pump 17 connected by a first section 18 of tubing to an inlet 19 of the balloon 12. A second section 20 of tubing commonly joined to the first section 18 is connected to an inlet of a solenoid valve 21, which is electrically coupled via a second wire 22 to a second output of the controller 15 so as to be actuated thereby. When the controller 15 feeds an actuation signal to the pump 17, ambient air is pumped through the tubing 18 into the balloon 12, while when the controller 15 feeds an actuation signal to the valve 21, air is released from the balloon 12 into the atmosphere via the second section 20 of tubing.

The controller 15 and associated electronics including the pump 17 and the valve 21 are powered by a rechargeable 11.1 volt lithium polymer battery 23, which is coupled to the controller 15 by a master switch 24. If desired the outer enclosure 13, shown in FIG. 2a, may be at least partially transparent and may be internally illuminated by a bank of light emitting diodes (LEDs) 25 driven by an LED driver 26 that is coupled to the battery 23 by an auxiliary switch 27. If desired the LEDs 25 may be independently controlled by the controller 15 so as to serve as a height indicator whereby, for example, as the device rises more LEDs are illuminated and as it falls fewer LEDs are illuminated or vice versa.

In order to raise the support structure 11 and any object attached thereto from its rest position and likewise to bring it down to ground when desired, it is preferable that the controller 15 be capable of remote actuation. To this end, there may be connected to the controller a wireless communications device such as an RF module 28 capable of remote control via an RF controller 29 (constituting a remote controller). Such devices are well-known are operate at a frequency of approximate 433 MHz over limited distances, such that FCC approval (or the equivalent) is not required. Alternatively, other modes of wireless communication such as cellular or Bluetooth may be employed. Remote control may not be necessary in cases where an object is to be raised to a permanent fixed position, for example when used for purely decorative purposes or possibly for fixed displays such as emergency exit signs, advertisements and the like. In such cases, there may be provided a calibrated dial (not shown) coupled to controller 15 bearing a scale that is calibrated as a function of weight to be supported and desired height. The dial may be set according to the weight of an attached object and the height to which it must be raised, in order to pump a sufficient quantity of air into the balloon 12 at exactly the right pressure to produce the desired buoyancy. Alternatively, when the support structure is integral with the object, the dial need be set according to the height only since the weight of the supported structure is invariable. In yet other embodiments, no external calibration is provided and the controller is preset to raise the support structure to a height that is either predetermined in the factory when no external object is carried by the support structure or which will vary depending on the weight of an external object carried by the support structure.

In the embodiment shown in FIGS. 2a and 2b the outer enclosure 13 is rigid and of fixed volume regardless of the amount of helium contained therein while the hollow inner enclosure 12 is flexible. In this case, increasing the quantity of helium in the outer balloon increases the overall mass but has negligible effect on the buoyancy of the balloon. So for a fixed mass of helium in the outer balloon, height adjustment is effected by changing the mass of air in the inner balloon.

Figure 3A:
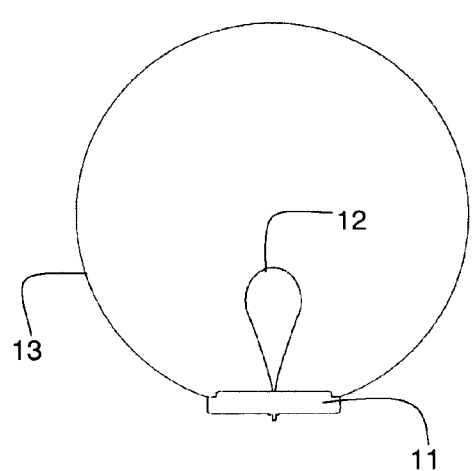
FIGS. 3a and 3b show schematically a support structure having a height transducer in accordance with an embodiment of the invention.
Figure 3B:
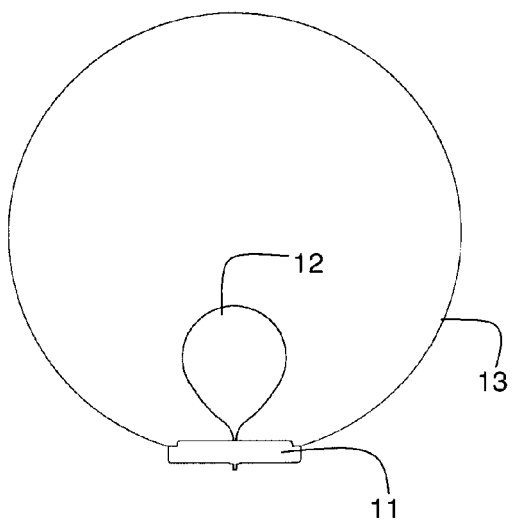

FIGS. 3a and 3c show an alternative structure where both the outer enclosure 13 and the inner hollow enclosure 12 are flexible. Adding helium to the outer balloon increases its mass and volume. The increase in volume increases the buoyancy of the balloon, which lifts the balloon, while the resultant increase in mass lowers the balloon. So also in this embodiment, the dominant control factor is the mass of air in the inner balloon, any change in the amount of helium in the outer balloon being less significant. Alternatively (not shown) only the outer enclosure 13 may be flexible.

In all of these embodiments, atmospheric air is used as the control gas so that the inner enclosure into which the air is pumped or from which it is released serves as a ballast tank for the outer enclosure rather like ballast tanks are used to adjust the buoyancy of a submarine. This has the advantage that no external gas supply need be coupled to the pump. However, for the sake of completeness, the principle of the invention may also be applied in reverse where helium is used as the control gas. In this case, helium may be pumped into the inner flexible enclosure to increase the buoyancy and may be released therefrom to reduce the buoyancy. This is less attractive since an external source of helium must be borne by the support structure and coupled to the pump inlet. This adds weight to the structure and wastes helium which unlike ambient air must be periodically replenished.

Such an embodiment may nevertheless find use when a fixed, lightweight object is to be supported such that the required buoyancy may be provided by a low-volume balloon. An outer rigid enclosure may be used whose fixed volume serves as the desired volume of helium for providing the required buoyancy. In such an embodiment, the required buoyancy is achieved by pumping helium into the inner balloon until it assumes the internal contour of the outer enclosure. Ignoring any fine-tuning that may be required to compensate for fluctuations in ambient temperature, the volume of helium in the balloon is then sufficient to lift the object.

Moreover such an embodiment may find use where a small helium bottle is carried on the support structure in order to launch the object by filling the outer chamber with helium, while thereafter regulating the height by pumping air into or out of the inner balloon as explained above. The support structure could be collapsible such that upon launching either from the ground or from the air, helium is discharged from the helium bottle into the outer enclosure thereby causing inflation of the outer enclosure and deployment of the support structure. Optionally, the empty helium bottle could then automatically be jettisoned.

Figure 4A:
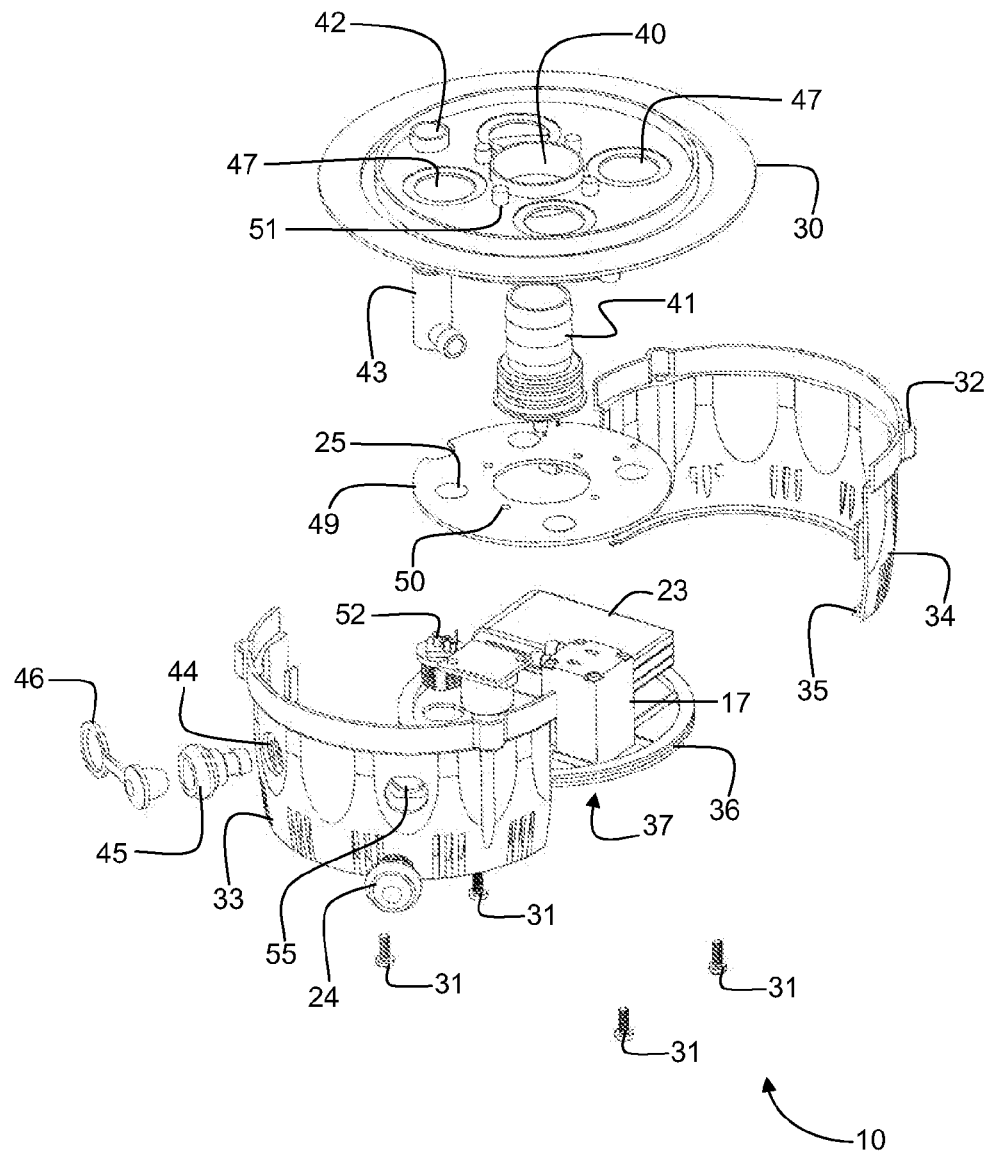
FIGS. 4a and 4b are exploded pictorial views seen from opposite sides of a control system according to an embodiment of the invention.
Figure 4B:
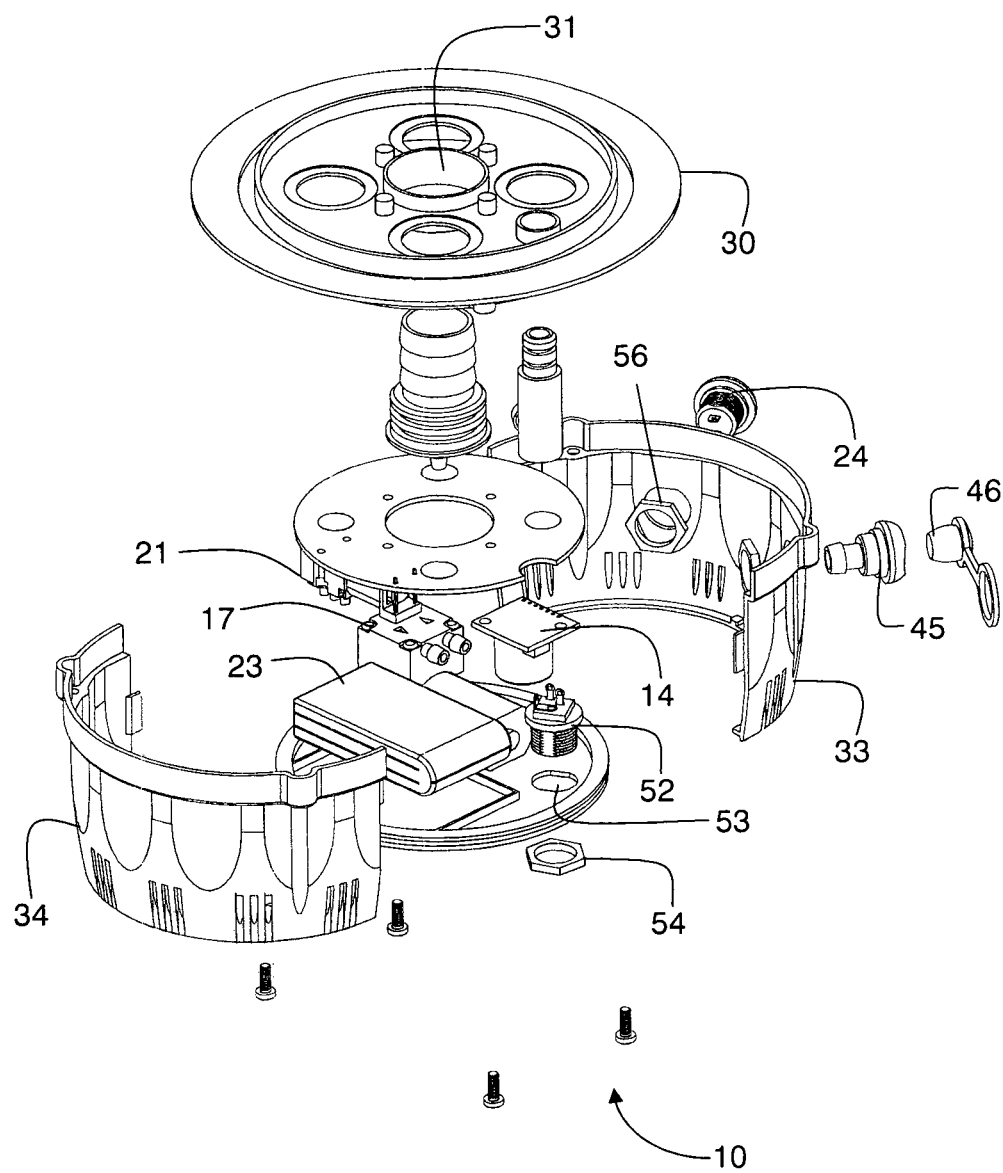
Figure 5A:
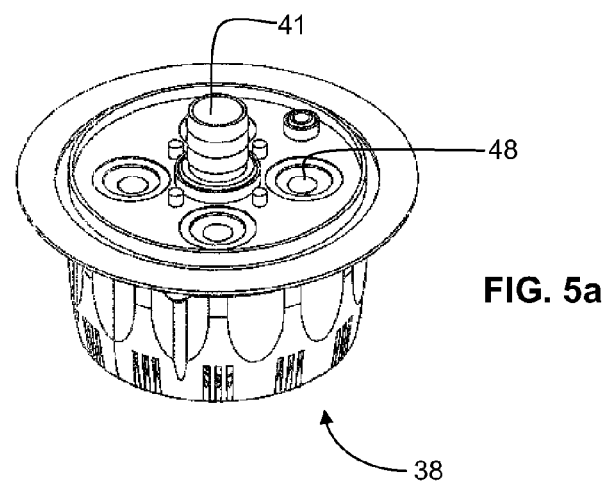
FIGS. 5a, 5b and 5c are perspective views of the system of FIGS. 4a and 4b.

Referring to FIGS. 4 and 5 there are shown pictorial views of the control system 10 according to one embodiment. The support structure 11 includes a circular top plate 30 around a rim of which the outer enclosure (not shown in these figures) is welded so that the rim provides a gas-tight seal. Threaded bores (not shown) are formed on a lower surface of the top plate 30 for engaging screws 31 that are inserted through apertures 32 accessible from an exterior of a pair of opposing semi-cylindrical side portions 33 and 34 so as to secure the side portions 33 and 34 to the lower surface of the top plate 30. Respective arcuate rims 35 are formed on an inner surface of each of the side portions 33 and 34 toward their lower edges, and engage a circumferential slot 36 in a base plate 37. During assembly, the controller 15 (shown in FIG. 1) and associated components are mounted on the base plate 37 after which the side portions 33 and 34 are fitted to the base plate and then secured by the screws 31 to the top plate 30, so as to form a generally cylindrical casing 38 (shown in FIG. 5a) the top of which supports the outer enclosure 13.

The top plate 30 includes a central aperture 40 through which a tapered ribbed connector 41 is sealingly inserted and on to which the flexible balloon is fitted, thus allowing air to be pumped into the inner flexible balloon 12 or released therefrom. An aperture 42 within the top plate 30 is connected to a gas inlet 43 that protrudes through an aperture 44 in the side portion 33 and terminated by a cap 45 connected to the gas inlet 43 via tubing (not shown). The gas inlet 43 allows helium to be pumped from an external source into the outer enclosure, after which the cap 45 is sealed by a plug 46 to prevent the helium from escaping. Alternatively, the cap 45 may be a one-way valve, in which case the plug 46 is not necessary.

Also formed in the top plate 30 is a plurality of recessed apertures 47 into which respective lenses 48 shown in FIG. 5a are sealingly attached. The lenses 48 pass light from the LEDs 25 into the outer enclosure 13, which is at least partially transparent so as to emit the light of the LEDs. The LEDs 25 are mounted on the upper surface of a two-sided printed circuit board (PCB) 49, having apertures 50 through which the PCB is screwed to respective threaded bores 51 in the top plate 30. Also shown in FIGS. 4a and 4b are the altitude sensor 14, the pump 17 and the battery 23 as well a charger terminal 52 allowing connection of an external charger for recharging the battery 23. The charger terminal 52 protrudes through an aperture 53 in the base plate 37 and is secured by a nut 54. The master switch 24 is fitted through an aperture 55 and secured by a nut 56 inside the side portion. The first section 18 of tubing shown in FIG. 1 is coupled at one end to an outlet of the pump 17 and its opposite end is attached to a tapered ribbed connector that is complementary to the connector 41 into which it is inserted. The second section 20 of tubing is connected at one end to the inlet of the solenoid valve 21, its opposite branching out from the first section 18 as shown in FIG. 1. The tubing is not shown in FIGS. 4a and 4b so as not to obscure the other components shown therein.

In practical embodiments, the altitude sensor 14 is capable of measuring height up to 50 m with an error of no more than ±1 meter. The controller 15 is responsive to a first reference signal indicative of a desired preset altitude for launching the support structure to this altitude. Thereafter, the controller 15 may respond to a second reference signal indicative of a permissible difference between an instantaneous altitude and the preset altitude for maintaining the height to within a specified tolerance. The reference signals may be set externally and constantly varied by a remote control unit.

Figure 5B:
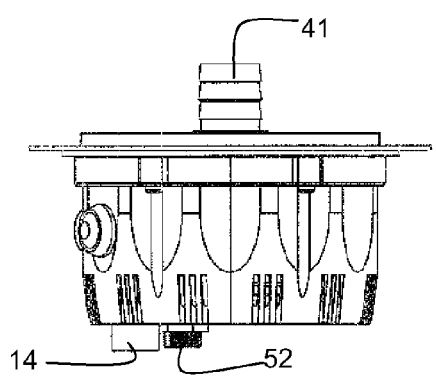
Figure 5C:
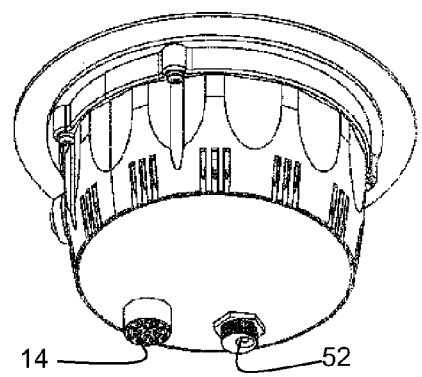

In a prototype of the above embodiment reduced to practice, the altitude sensor was a type LV-MaxSonar®-EZ3™ sonar range finder produced by MaxBotix® Inc. of Arizona, USA. The pump was a 9 volt brush motor CTS diaphragm pump type A.1C25N.C09VDC produced by Hargraves of North Carolina, USA and the solenoid valve was a type 75 Magnum 5 volt, 2 watt, 15 PSI valve also produced by Hargraves. The LV-MaxSonar®-EZ3™ sonar range finder whose exterior is shown in FIGS. 5b and 5c detects objects from 0 to 6.45 m with a 25.4 mm resolution.

Figure 6A:
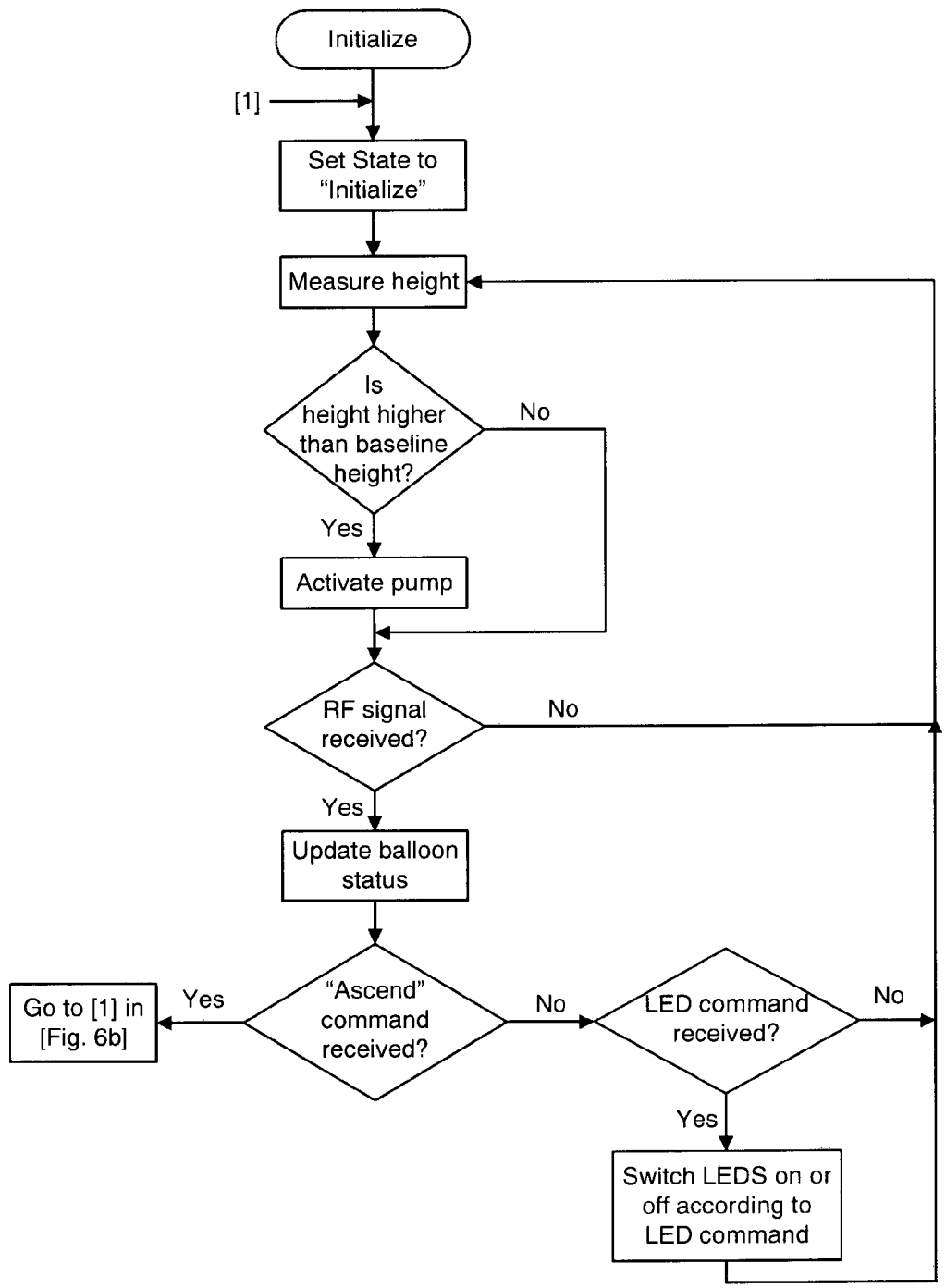
FIGS. 6a and 6b are flow diagrams showing operation of the controller.
Figure 6B:
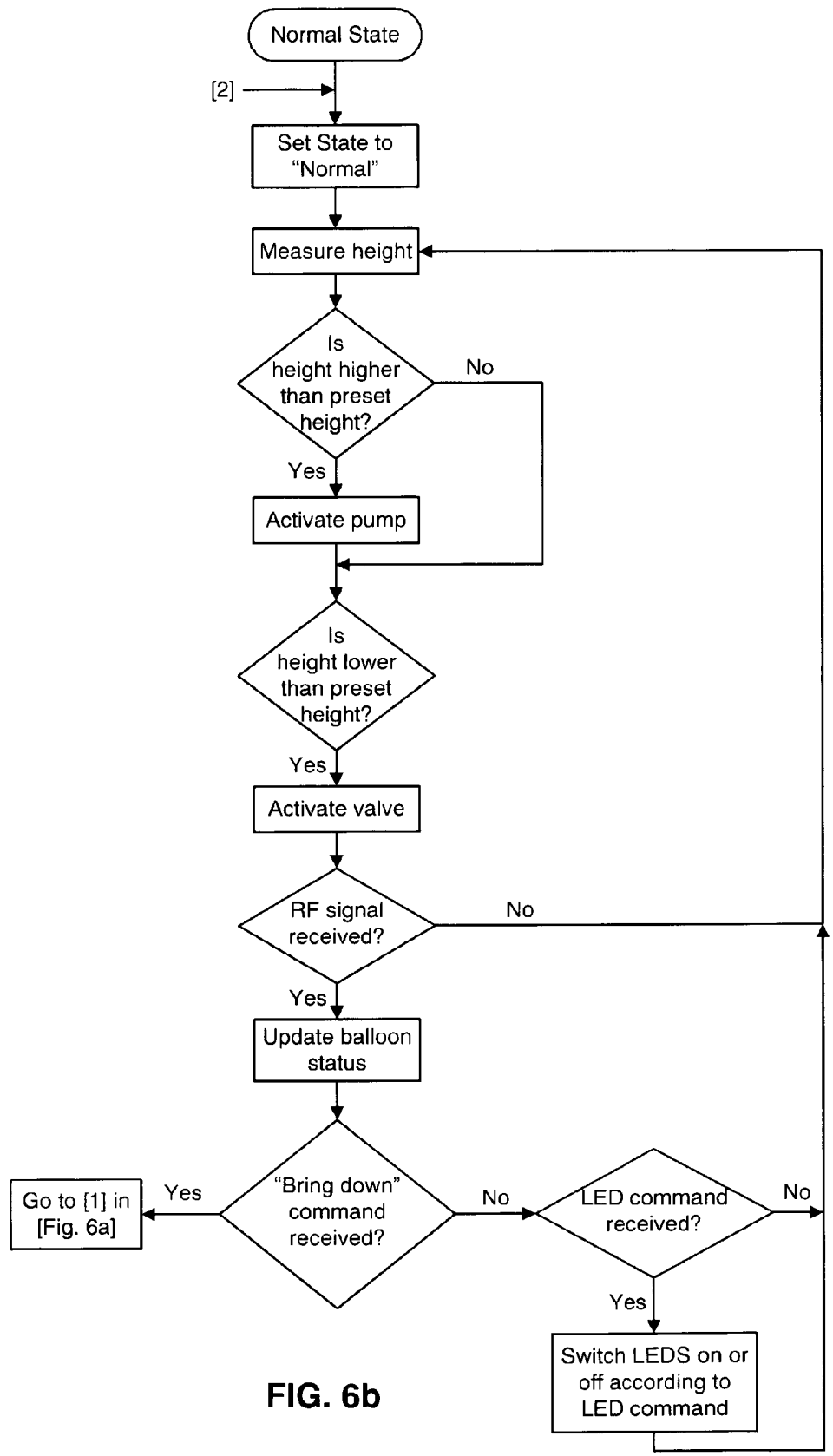

FIGS. 6a and 6b are flow diagrams showing operation of the controller 15 with the structure shown in FIGS. 2a and 2b. For convenience, the controller 15 operates according to two different states. FIG. 6a shows an initialization procedure which is executed before the balloon 12 has reached steady state, for example, when the device is raised for the first time from its dormant state. In this state, the outer enclosure 13 is full of helium and the inner balloon 12 is virtually empty. It is preferable that the feedback control come into effect only when there is sufficient air in the inner balloon to prevent the balloon rising uncontrollably since if the balloon were released with insufficient air, it might fly well beyond the desired height before there was sufficient air to weigh it down. This is undesirable for two reasons. First, during the short time period before there is sufficient air in the inner balloon, the device is out of control. Secondly, if it were to fly too high there might be a risk that it would no longer be within the operating range of the altitude sensor. The only way to restore control would be to force the device to descend using the remote control so as to add air gradually to the inner balloon since, if too much air is pumped into the inner balloon, there is a danger that the inner balloon will burst. In effect, the initialization procedure allows the balloon to be controlled independent of the feedback control provided by the altitude sensor, until the device reaches steady state, when feedback control is then permitted.

Thus, in FIG. 6a the controller determines whether the device is higher than a specified baseline height which is set to a deliberately low level that the controller is led to infer that the device is too high. This forces the controller to activate the pump so as to fill the balloon. This can be done even while holding the device so as to prevent it from rising under the buoyancy of the helium-filled outer enclosure. When sufficient air is in the inner balloon, the status may be changed using the RF control whereupon the normal state is initiated as shown in FIG. 6b, which shows a simple feedback mechanism where the height is compared with a preset desired height. If the height is greater than the preset height, the pump is activated so as to pump more air into the inner balloon, thus causing the device to descend. If the height is lower than the preset height, the valve is activated so as to release air from the inner balloon, thus causing the device to ascend.

In both states, the RF controller is able to change the current status and this is used to lower the device to ground from steady state. It may also be used to control the LEDs in the event that the device is a floating lamp, so that the lamp can be switched on and off without the need to bring it back down to ground level. However, as noted previously, the LEDs may be used as height indicators, in which case the number of LEDs that are illuminated may be used as an indication of height. Alternatively different colored LEDs may be illuminated depending on the measured height. In the case that the LEDs are used as visible height indicators, this may be in addition to LEDs being used as a primary source of illumination.

Operation of the device shown in FIGS. 4 and 5 is based on the well-known gas laws and is described in detail in our earlier WO 07/036930. It is not repeated here, first because it is common knowledge and more significantly because knowledge of the actual physics is not required by the controller of the present invention. This indeed is what sets it radically apart from the device described in WO 07/036930. The reason for this is that in WO 07/036930, there is no controller and no feedback mechanism, height control being achieved by a pre-calibrated pressure regulator valve. In such case, the valve is adjusted in the factory to adjust the pressure of helium in a floating balloon to the correct value, depending on assumed ambient conditions, for the buoyancy to be sufficient to lift an object of specified weight. This does not allow objects of different weight to be supported at the desired pre-set height. Alternatively, a dial may be provided that is calibrated in units equivalent to added mass, so as to allow objects of different weight to be supported at the desired pre-set height by adjusting the dial.

However, these conditions do not apply in the present invention where the controller adjusts the height transducer (such as constituted by the pump and the release valve in FIG. 1) based simply on whether the instantaneous height of the device is less than or greater than the preset height. Indeed in the embodiment described above, the buoyancy of the outer enclosure is invariable, height control being achieved by altering the weight of air in the inner balloon. In saying this, the nominal height to which a support structure of given weight will float does require an understanding of the physics. So the dimensions of the inner and outer enclosures, which govern the volume of helium in the outer enclosure and the counteracting weight of air in the inner enclosure, will obviously need to be selected depending on the combined weight of the support structure. The relevant theory that governs these design calculations now follows.

In equilibrium, the upward buoyancy force acting on the support structure and any attached object is exactly counterbalanced by the weight. The outer balloon floats in air and so its buoyancy force is given by:

$$F_B \rho_{Air} \times V_T \times g \tag{1}$$

where:
$V_T$ is the volume of the outer enclosure;
$\rho_{Air}$ is the density of the air; and
g is the acceleration due to gravity
The counter-acting weight is given by:

$$W = (m_{object} + m_{Air} + m_{He}) \times g \tag{2}$$

So, in order to support an object having a mass of 0.3 kg:

$$(0.3 + m_{Air} + m_{He}) \times g = \rho_{Air} \times V_T \times g \tag{3}$$

Applying the universal Gas Law:

$$P \times V = m \times R \times T \tag{4}$$

$$\rho = \frac{m}{V} = \frac{P}{R \times T} \tag{5}$$

The density of air is therefore given by:

$$\rho_{Air} = \frac{P_{Air}}{R_{Air} \times T_{Air}} \tag{6}$$

Likewise, the density of helium is given by:

$$\rho_{He} = \frac{P_{He}}{R_{He} \times T_{He}} \tag{7}$$

Assume that for air the following properties apply:
$T_{Air}$=15° C. (i.e. 288K);
$P_{Air}$=101325 Pa (i.e. atmospheric)
$R_{Air}$=287.05 J kg$^{-1}$ K$^{-1}$
Equation 6 gives:

$$\rho_{Air} = \frac{101325}{287.05 \times 288} = 1.226 \text{ kg/m}^3 \tag{8}$$

Assume that the temperature of the helium is the same as the air temperature and that its pressure is slightly higher than the air pressure, say 110000 Pa, i.e.
$T_{He}$=15° C. (i.e. 288K);
$P_{He}$=110000 Pa (i.e. slightly greater than atmospheric)
$R_{He}$=2077 J kg$^{-1}$ K$^{-1}$
Equation 7 gives:

$$\rho_{He} = \frac{110000}{2077 \times 288} = 0.184 \text{ kg/m}^3 \tag{9}$$

The mass of air in the inner balloon is given by:

$$m_{Air} = \rho_{Air} \times V_{Air} \tag{10}$$

Likewise, the mass of helium in the outer balloon is given by:

$$m_{He} = \rho_{He} \times (V_T - V_{Air}) \tag{11}$$

Substituting these values back into Equation 3, gives:

$$0.3 + \rho_{Air} \times V_{Air} + \rho_{Air} + \rho_{He} \times (V_T - V_{Air}) = \rho_{Air} \times V_T \tag{12}$$

As noted above, the air serves only as a ballast to fine-tune the buoyancy of the floating structure. So we will assume that at some initial height, the device will float even with no air in the inner balloon, i.e. $V_{Air}$=zero. In this case, the above equation simplifies to:

$$0.3 + \rho_{He} \times V_T = \rho_{Air} \times V_T \tag{13}$$

$$\text{i.e. } V_T = \frac{0.3}{\rho_{Air} - \rho_{He}} \tag{14}$$

$$\text{giving: } V_T = \frac{0.3}{1.226 - 0.184} \tag{15}$$
$$= 0.287 \text{ m}^3$$

Assume, for simplicity, that the outer balloon is spherical, such that its volume is given by:

$$V_T = \frac{4}{3}\pi R^3 \tag{16}$$

Its radius R is then given by:

$$R = \sqrt[3]{\frac{0.287 \times 3}{4\pi}} \tag{17}$$
$$= 0.41 \text{ m}$$

In other words, to achieve buoyancy for a light system having a nominal mass of 300 g, a spherical outer balloon must have a minimum diameter of 0.82 m, and the mass of helium in the outer balloon is equal to $\rho_{He} \times V_T$ i.e. 0.053 m³. This mass remains fixed even when air is pumped into the inner balloon, whereupon the combined mass of the support structure increases and the support structure then falls. Clearly, these figures are given by way of example only, but they demonstrate the applicability of the invention for supporting light structures having a mass less than 5 kg, capable of raising the structure from rest to a desired altitude and for maintaining constant altitude within an accuracy of ±1 meter.

Figure 7:
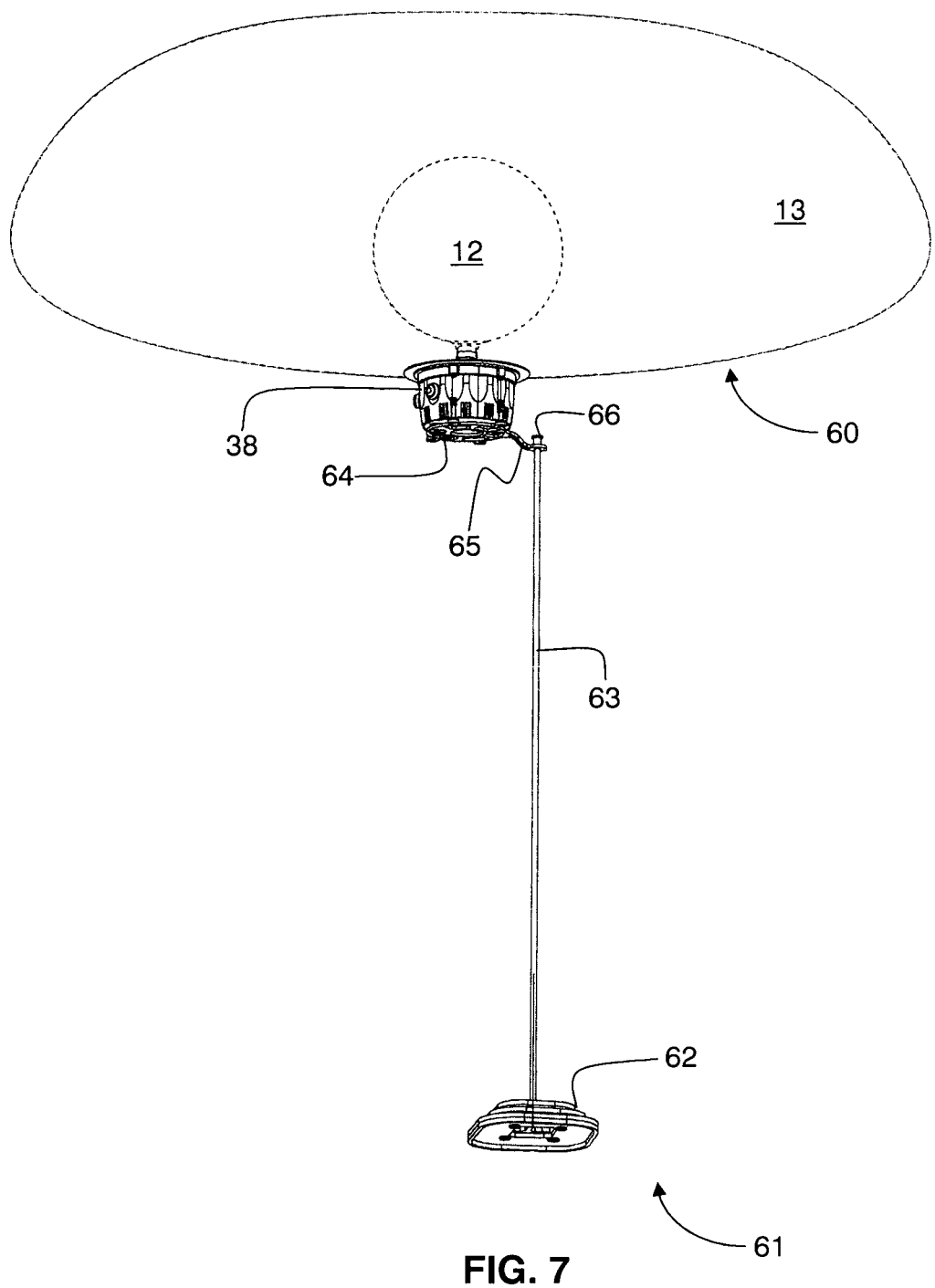
FIG. 7 shows pictorially a floating lamp device releasably mounted on a stand.

FIG. 7 shows pictorially such a device in the form of a floating lamp device 60 releasably mounted on a stand 61. The stand 61 has a base section 62 supporting a tubular pole 63. The cylindrical casing 38 of the lamp device 60 is releaseably mounted within a cradle 64 from a side of which protrudes an armature 65 having an aperture that rides up and down the pole 63 but is preventing from escaping by a retaining cap 66 fitted at the top of the pole.

Prior to use, the outer enclosure 13 is filled with helium and the cylindrical casing 38 of the lamp device 60 is mounted in the cradle 64. The cradle 64 may have circumferential resilient fingers that grip the side wall of the casing 38 and which may be splayed apart in order to release the lamp. The buoyancy of the structure causes the device 60 to ride up the pole from which it is prevented from escaping by the retaining cap 66. Under remote RF control, air is pumped in bursts into the inner balloon 12 in order to inflate it gradually. When sufficient air fills the inner balloon, the increased mass supersedes the buoyancy of the structure, which starts gradually to descend on the pole 63. The lamp device 60 may then be safely released from the cradle 64 and the mass of air in the inner balloon may be adjusted under remote RF control to raise or lower the device, as required.

Although the controller 15 is shown in FIG. 1 as a dedicated device for use with a single support structure, the invention also contemplates use of a remote controller that controls a plurality of structures. In such case, each support structure contains a memory that stores a unique ID. Each device communicates with the controller using a suitable bi-directional communications protocol which may, for example, allocate each device a non-overlapping time slot in order to avoid collision. Alternatively, better use of duty cycle may be achieved by allocating random time slots and correcting for lost transmissions owing to data collision. Such protocols are known per se and are not themselves a feature of the invention. For the sake of completeness, reference may be made to U.S. Pat. No. 6,600,899 to Elpas Electro-Optic Systems Ltd. of Ra'anana, Israel, which describes a method and system for effecting bi-directional data communication between an object transceiver and a reader and whose contents are incorporated herein by reference.

If desired the plurality of structures controlled by the remote controller may be mutually synchronized so as to participate in a coordinated scheme. For example, a series of floatable lamps each displaying a different letter may be controlled, so that remote operation of each lamp may be used to generate a choreographed message or advertisement. For example, each lamp may be raised to a desired preset height and then illuminated for a controlled time duration; the illuminated lamps may be raised and lowered so as to create moving messages, and so on. Likewise, in a security application, a plurality of support structures may be used to support a camera that is then used to image a specific area. The remote control unit allows coverage to be adjusted by suitable control of the constituent support structures.

In the embodiment described so far, the outer enclosure is a rigid enclosure filled with helium and the inner enclosure contains air that serves as ballast. However, it is to be noted that this embodiment is but one possible approach. Thus, if desired the outer enclosure can be filled with air and the buoyancy of the device can be adjusted by adding or releasing helium from the inner flexible balloon. In such case the outer enclosure will also be rigid. Alternatively, the outer enclosure can be flexible and the buoyancy of the device can be varied by varying the volume of helium therein.

All these approaches are based on varying the ratio between the volume of air and helium in order to change the buoyancy of the floating structure. Specifically, the height transducer in FIG. 1 is constituted by the pump 17 and the valve 21 and adjusts the volume and hence mass of gas in the flexible balloon as a function of height. But since the universal gas law relates pressure (P), volume (V) and temperature (T) such that PV/T remains constant regardless of a change in any of these properties, buoyancy may also be regulated by using height transducers which are dependent on either temperature or pressure.

Figure 8:
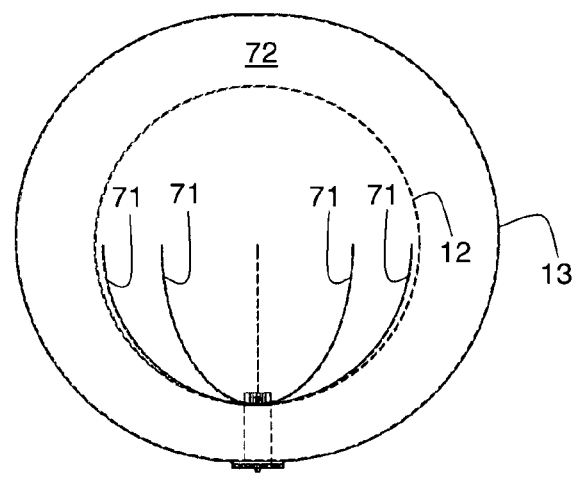
FIG. 8 shows schematically a support structure having a height transducer in accordance with another embodiment of the invention.

FIG. 8 shows schematically a height transducer 70 that works on temperature adjustment of the gas inside a rigid hollow enclosure 12, the gas being lighter than air, most typically helium. Heating elements 71 heat the gas therein so as to render it less dense than the surrounding gas, which is usually air so that the device rises. In this embodiment there is technically no need for an outer enclosure. However, in practice it is preferable that the enclosure 12 be enclosed within an outer enclosure 13 and that the space between the two be filled with thermally insulating material 72. When the heating elements 61 are de-energized the gas cools and the buoyancy of the enclosure 12 decreases so that the device falls. The effect can be enhanced by provided more active cooling of the gas inside the enclosure 12 by providing a small cooling device, such a thermoelectric cooling device.

In this embodiment, the controller 15 is responsive to the hollow enclosure 12 falling below the preset altitude for energizing the heating elements 71 so as to increase the buoyancy of the hollow enclosure, and is responsive to the hollow enclosure rising above the preset altitude for de-energizing the heating elements 71, thereby allowing the gas to cool and reducing the buoyancy of the hollow enclosure.

It will, of course, be recognized that adjusting the altitude of a gas balloon by heating the gas is well-known per se and has long been used in hot air balloons. However, hot air balloons are generally manned by a pilot who controls the height of the craft by regulating the flow of hot air into the balloon. In contrast thereto, the present invention is unmanned and uses an on-board controller to maintain the device at a preset altitude automatically.

Figure 9A:
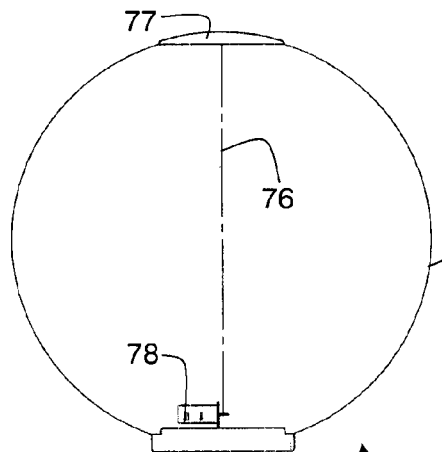
FIGS. 9a and 9b show schematically a support structure having a height transducer in accordance with another embodiment of the invention.
Figure 9B:
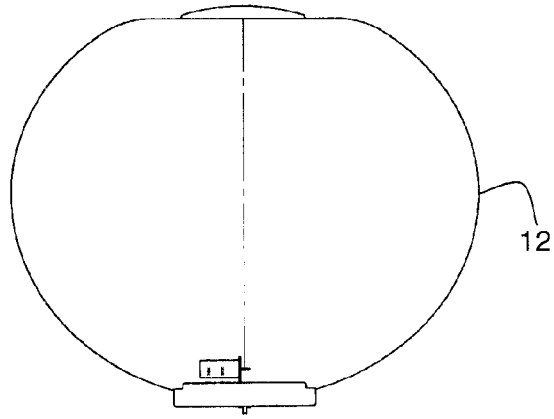

FIGS. 9a and 9b show schematically a height transducer 75 that works on volume adjustment of the gas inside a rigid enclosure 12, the gas being lighter than air, most typically helium. By "rigid" is meant that the enclosure is not elastic but is capable of elastic deformation. So it cannot be inflated like a balloon, but its volume can be reduced by application of a force that squashes or otherwise contracts the walls of the enclosure such that releasing the force restores the shape and volume of the enclosure to it initial state. In this case, the height transducer includes a cord 76 inside the hollow enclosure, a first end of which is anchored to an internal wall 77 of the hollow enclosure and a second end of which is coupled via a motor 78 to the controller 15. The controller is adapted to vary the volume of the gas within the hollow enclosure in accordance with the measured altitude by adjusting the tension of the cord. Thus, upon the hollow enclosure falling below the preset altitude, the motor 78 decreases the tension of the cord 76 so as to increase the volume of gas within the hollow enclosure and thereby increase the buoyancy of the hollow enclosure. When the hollow enclosure rises above the preset altitude, the motor winds the cord 76 so as to decrease the volume of the gas within the hollow enclosure and thereby reduce the buoyancy of the hollow enclosure.

The cord constitutes a volume adjustment device whose adjustment serves to adjust the pressure of the gas within the flexible balloon by applying force to the wall of the enclosure so as to collapse or expand the enclosure. It will be appreciated that other forms of volume adjustment device or height-pressure transducers may likewise be employed. For example, a rigid link can be eccentrically coupled to the motor so as to urge the internal wall 67 either further away from or closer to the motor.

While the height transducers described above are based on the universal gas law, it will be understood that any height transducer that is capable of changing a variable height-dependent property of gas inside the hollow enclosure as a function of measured height may also be employed.

It will also be understood that the controller according to the invention may be a suitably programmed processor. Likewise, the invention contemplates a computer program being readable by a processor for controlling the controller. The invention further contemplates a machine-readable memory tangibly embodying a program of instructions executable by the controller for performing the necessary control.

The invention claimed is:

1. A controllable buoyant system comprising:
   a buoyant support structure having a sealed hollow enclosure for containing a first gas having a variable height-dependent property that is used to vary the buoyancy of the support structure, said hollow enclosure being surrounded by a second gas contained within the buoyant support structure such that either the first gas or the second gas is lighter than ambient air, said hollow enclosure being pre-filled with said first gas via a one-way valve that prevents the first gas from escaping from the hollow enclosure,
   an altitude sensor for generating an altitude signal indicative of a height of the support structure,
   a height transducer responsive to the altitude signal for varying buoyancy of the support structure by changing the variable height-dependent property of the first gas inside the hollow enclosure as a function of measured height, and
   a controller coupled to the altitude sensor and to the height transducer and being responsive to said altitude signal and to at least one reference altitude signal for automatically controlling the height transducer in order to maintain the support structure buoyant at the preset altitude;

characterized in that:
   the altitude sensor is capable of measuring height up to 50 m with an error of no more than ±1 meter, and
   the controller is adapted to control the system automatically independently of feedback control provided by the altitude sensor during an initialization phase so as to ensure that there will be sufficient ballast in order to allow control of the system throughout the operating range of the altitude sensor.

2. The system according to claim 1, wherein the at least one reference altitude signal includes a first reference signal indicative of a desired preset altitude.

3. The system according to claim 1, wherein the at least one reference altitude signal includes a second reference signal indicative of a permissible difference between an instantaneous altitude and the preset altitude.

4. The system according to claim 1, wherein:
   the hollow enclosure is elastic,
   a pump is coupled to an inlet of the hollow enclosure via a releasable valve, and
   the controller is responsive to the altitude signal for pumping air into the hollow enclosure so as to inflate the hollow enclosure or for opening the releasable valve so as to deflate the hollow enclosure.

5. A method for raising the system according to claim 4 to said preset altitude, the method comprising:
   specifying a baseline height that is less than the desired preset altitude;
   during the initialization phase using the baseline height as a reference for the controller so that controller infers that the device is too high and automatically activates the height transducer for pumping air into the hollow enclosure; and
   automatically changing to the regulation phase when sufficient air is in the hollow enclosure.

6. The method according to claim 5, wherein during the initialization phase the support structure is prevented from rising under the buoyancy of the hollow enclosure.

7. The method according to claim 5, including changing from the initialization phase to the regulation phase using remote control.

8. The system according to claim 1, wherein:
   the height transducer includes at least one electrical heating element inside the hollow enclosure, and
   the controller is responsive to the support structure falling below said predetermined altitude for heating the lighter-than-air gas so as to increase the buoyancy of the hollow enclosure and is responsive to the support structure rising above said predetermined altitude for allowing the lighter-than-air gas to cool so as to reduce the buoyancy of the hollow enclosure.

9. The system according to claim 8, wherein:
   the controller is adapted to cool the first gas by de-energizing the at least one electrical heating element so as to allow the first gas to cool passively.

10. The system according to claim 8, further including:
    a cooling device for actively cooling the first gas;
    the controller being adapted to cool the first gas by energizing the cooling device in addition to de-energizing the at least one electrical heating element.

11. The system according to claim 1, wherein:
    the hollow enclosure is substantially rigid,
    the height transducer includes a volume adjustment device inside the hollow enclosure for coupling a wall of the hollow enclosure to the controller, and
    the controller is responsive to the support structure falling below said predetermined altitude for adjusting the volume adjustment device so as to increase the volume of gas within the hollow enclosure and thereby increase the buoyancy of the hollow enclosure and is responsive to the support structure rising above said predetermined altitude for adjusting the volume adjustment device so as to decrease the volume of the gas within the hollow enclosure and thereby reduce the buoyancy of the hollow enclosure.

12. The system according to claim 11, wherein:

the volume adjustment device is a cord a first end of which is anchored to an internal wall of the hollow enclosure and a second end of which is coupled to the controller, and the controller is adapted to vary the volume of the gas within the hollow enclosure by adjusting the tension of the cord.

13. The system according to claim 12, wherein the cord is coupled to the controller via a motor, which is actuated by the controller to wind or unwind the cord so as to increase or decrease, respectively, the tension within the cord.

14. The system according to claim 1, wherein:

the hollow enclosure is elastic, a pump is coupled to a gas inlet of the hollow enclosure via a releasable valve, and the controller is responsive to the altitude signal for pumping the lighter-than-air gas into the hollow enclosure so as to inflate the hollow enclosure or for opening the releasable valve so as to deflate the hollow enclosure.

15. The system according to claim 1, being self-powered by a battery.

16. The system according to claim 1, being powered by radiation conveyed to the electrical device.

17. The system according to claim 16, being solar-powered.

18. The system according to claim 1, wherein the support structure serves as a platform for supporting an attached object.

19. The system according to claim 1, having a selector coupled to the controller for setting the preset altitude.

20. The system according to claim 1, further including a remote control unit coupled to the controller for remote actuation of the controller, said remote control unit being adapted to stabilize the support structure and any object attached thereto at any specified altitude within the range of the altitude sensor.

21. The system according to claim 20, wherein the remote control unit is an RF module.

22. The system according to claim 20, wherein the support structure is identified by a unique ID and the controller is responsive to the unique ID for associating a received altitude signal with the support structure and for sending control signals to the height transducer within the support structure, thus allowing remote control of more than one support structure by a remote controller.

23. The system according to claim 22, including a plurality of support structures each containing a respective controller, all the controllers being mutually synchronized.

24. The system according to claim 1, wherein the controller is adapted to execute an initialization phase until the support structure reaches steady state and then to execute a regulation phase to maintain the support structure at the desired preset altitude.

25. The system according to claim 1, wherein the altitude sensor is adapted to measure height from 0 to 6.45 m with a resolution of less than 100 mm.

26. The system according to claim 1, having a combined mass less than 5 kg.

* * * * *